(12) United States Patent
Ondeck

(10) Patent No.: US 9,652,754 B2
(45) Date of Patent: May 16, 2017

(54) METHOD, MEDIUM, AND SYSTEM FOR PAYMENT ON CALL IN A NETWORKED ENVIRONMENT

(71) Applicant: PayPal, Inc., San Jose, CA (US)

(72) Inventor: Kristen Ondeck, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 335 days.

(21) Appl. No.: 14/318,599

(22) Filed: Jun. 28, 2014

(65) Prior Publication Data

US 2014/0316978 A1 Oct. 23, 2014

Related U.S. Application Data

(63) Continuation of application No. 11/841,158, filed on Aug. 20, 2007, now Pat. No. 8,799,109.

(51) Int. Cl.
*G06Q 30/00* (2012.01)
*G06Q 20/12* (2012.01)
*G06Q 20/04* (2012.01)
*G06Q 20/40* (2012.01)
*G06Q 30/06* (2012.01)

(52) U.S. Cl.
CPC ............. *G06Q 20/12* (2013.01); *G06Q 20/04* (2013.01); *G06Q 20/40* (2013.01); *G06Q 30/0617* (2013.01)

(58) Field of Classification Search
CPC ... G06Q 30/0635; G06Q 20/102; G06Q 20/12
USPC ...................................... 705/26.1, 26.81, 40
See application file for complete search history.

(56) References Cited

U.S. PATENT DOCUMENTS

| | | | | |
|---|---|---|---|---|
| 5,715,314 A * | 2/1998 | Payne | .................. | G06Q 10/087 705/26.35 |
| 5,727,163 A * | 3/1998 | Bezos | .................. | G06Q 20/385 235/379 |
| 5,903,721 A * | 5/1999 | Sixtus | ................... | G06Q 20/02 726/2 |
| 2002/0007345 A1* | 1/2002 | Harris | ................... | G06Q 20/02 705/44 |
| 2004/0267628 A1* | 12/2004 | Stillman | ................ | G06Q 30/06 705/26.35 |
| 2005/0065881 A1* | 3/2005 | Li | ....................... | G06Q 30/0641 705/40 |

(Continued)

FOREIGN PATENT DOCUMENTS

WO WO-2009025811 A2 2/2009
WO WO-2009025811 A3 2/2009

OTHER PUBLICATIONS

"U.S. Appl. No. 11/841,158, Advisory Action mailed Sep. 21, 2010", 3 pgs.

(Continued)

*Primary Examiner* — Matthew Zimmerman
(74) *Attorney, Agent, or Firm* — Maschoff Brennan

(57) ABSTRACT

A computer-implemented method and system is disclosed in which a network-based e-commerce environment includes a merchant site to receive a voice call associated with a purchase transaction from a consumer, generate a payment request corresponding to the consumer purchase transaction in response to receiving the voice call, send the payment request to a payment site, and receive confirmation from the payment site that payment for the consumer purchase transaction has been received.

16 Claims, 8 Drawing Sheets

(56) References Cited

U.S. PATENT DOCUMENTS

| | | | | |
|---|---|---|---|---|
| 2005/0246293 | A1* | 11/2005 | Ong | G06Q 20/02 705/70 |
| 2006/0095327 | A1* | 5/2006 | Vaughn | G06Q 30/02 705/14.25 |
| 2006/0144925 | A1* | 7/2006 | Jones | G06Q 20/40 235/380 |
| 2007/0162334 | A1* | 7/2007 | Altberg | G06Q 30/02 705/14.68 |
| 2007/0233573 | A1* | 10/2007 | Wang | G06Q 20/00 705/26.1 |
| 2009/0055282 | A1 | 2/2009 | Ondeck | |

OTHER PUBLICATIONS

"U.S. Appl. No. 11/841,158, Final Office Action mailed Mar. 20, 2009", 9 pgs.

"U.S. Appl. No. 11/841,158, Final Office Action mailed Apr. 3, 2010", 12 pgs.

"U.S. Appl. No. 11/841,158, Non Final Office Action mailed Aug. 6, 2008", 10 pgs.

"U.S. Appl. No. 11/841,158, Non Final Office Action mailed Sep. 16, 2009", 10 pgs.

"U.S. Appl. No. 11/841,158, Notice of Allowance mailed Mar. 20, 2014", 9 pgs.

"U.S. Appl. No. 11/841,158, Response filed Jun. 2,, 2009 to Final Office Action mailed Mar. 20, 2009", 9 pgs.

"U.S. Appl. No. 11/841,158, Response filed Sep. 13, 2010 to Final Office Action mailed Apr. 13, 2010", 10 pgs.

"U.S. Appl. No. 11/841,158, Response filed Dec. 8, 2008 to Non-Final Office Action mailed Aug. 6, 2008", 8 pgs.

"U.S. Appl. No. 11/841,158, Response filed Dec. 16, 2009 to Non Final Office Action mailed Sep. 16, 2009", 8 pgs.

"International Application Serial No. PCT/US2008/009897, Search Report mailed Jan. 30, 2009", 4 pgs.

"International Application Serial No. PCT/US2008/009897, Written Opinion mailed Jan. 30, 2009", 8 pgs.

"Is P2P VoIP the Next Revolution for SMEs?", [Online]. Retrieved from the Internet: <URL:http:// www.voipplanet.com/solutions/article.php/3556016>, (Oct. 13, 2005).

Fong, et al., "Mobile mini-payment scheme using SMS-credit.", Computational Science and Its Applications—ICCSA 2005. Springer Berlin Heidelberg, (2005), 1106-1114.

* cited by examiner

METHOD, MEDIUM, AND SYSTEM FOR PAYMENT ON CALL IN A NETWORKED ENVIRONMENT

CROSS-REFERENCE TO RELATED APPLICATIONS

This application is a continuation of prior application Ser. No. 11/841,158, filed on Aug. 20, 2007, which is incorporated by reference herein in its entirety.

BACKGROUND

Technical Field

This disclosure relates to methods and systems supporting online consumer interactions by a user in a networked system.

Related Art

Conventional network-based marketplaces (e.g. consumer websites) provide users with functionality to browse a collection of items (e.g. goods or services) at a website and to make purchases using a variety of means. Many commercial websites provide several payment methods. Some of these methods include transferring customer credit card information to the merchant site for processing. The well-known PayPal system enables a customer to set up a user account that may be used for payment of network-based commercial transactions. In other payment systems, a merchant can take customer credit card information by telephone and process the credit transaction manually. Although phone-based payment systems are easy and fast for consumers, conventional phone payment services typically require the merchant to perform additional processing steps, such as entering customer credit card information into a phone-based system. These additional steps create delays and the potential for errors in processing the phone payment transaction. Further, the merchant becomes aware of the customer's credit card information or other personal financial information, which may lead to security problems for the customer.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of an embodiment of the present invention. It will be evident, however, to one of ordinary skill in the art that embodiments may be practiced without these specific details.

Below are described various aspects of a networked e-commerce system that may be used with voice communications and related electronic payment. A system architecture of an example networked e-commerce platform is illustrated in FIG. 1.

Figure 1:
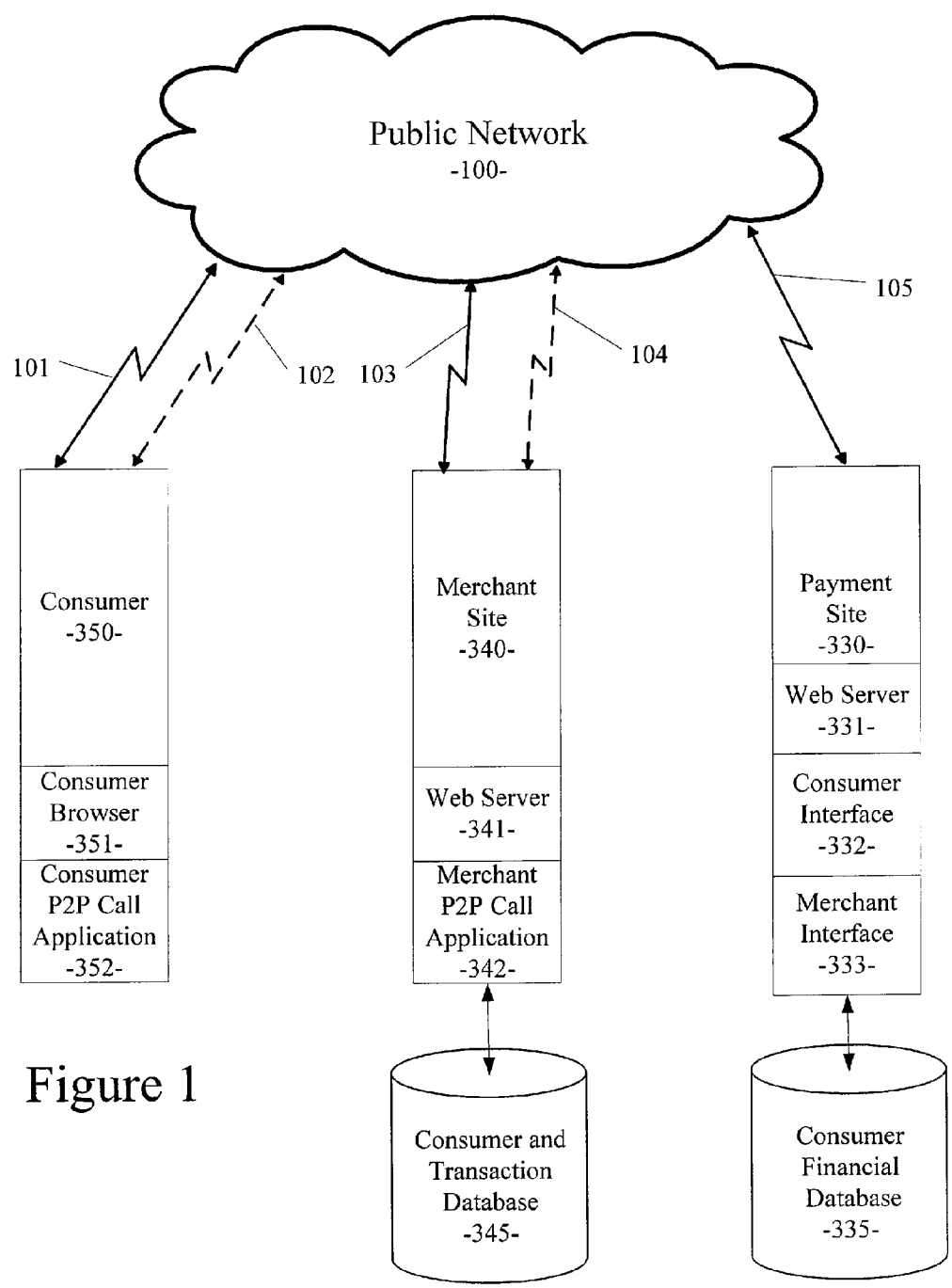
FIG. 1 illustrates an architectural network overview of an example embodiment.

Referring to FIG. 1, a networked e-commerce system is shown to include a consumer system 350, a merchant site 340, and a payment site 330. Consumer system 350 represents a conventional client system, such as a conventional personal computer with a standard consumer browser 351 (e.g. Microsoft Internet Explorer) and a network connection 101 to public network 100 (e.g. the Internet). A user can operate consumer system 350 to perform e-commerce transactions with a merchant site 340 via network 100.

Merchant site 340 represents a conventional vendor server/computer with a standard web server 341 and a network connection 103 to public network 100 (e.g. the Internet). A merchant can operate merchant site 340 to perform e-commerce transactions with a consumer system 350 via network 100. The merchant site 340 typically maintains a data repository 341 in which consumer and transaction information can be stored and queried. It will be apparent to those of ordinary skill in the art that data repository 341 may equivalently be remotely connected to merchant site 340 (e.g. via a network).

Payment site 330 represents a conventional payment server/computer (e.g. a site operated by PayPal) with a standard web server 331 and a network connection 105 to public network 100 (e.g. the Internet). A financial service provider can operate payment site 330 to perform e-commerce financial transactions with a consumer system 350 and merchant site 340 via network 100. The payment site 330 typically maintains a data repository 335 in which consumer and financial information can be stored and queried. It will be apparent to those of ordinary skill in the art that data repository 335 may equivalently be remotely connected to payment site 330 (e.g. via a network).

In addition to the conventional networked e-commerce platform described above, consumer system 350 may also establish a voice communication connection with merchant site 340 using conventional voice-over-Internet-Protocol (VoIP) technology or VoIP via a peer-to-peer (P2P) network, such as Skype. In either case, voice communication is converted to data packets and transferred between consumer system 350 and merchant site 340 via network 100. This voice connection is represented in FIG. 1 as consumer system 350 voice communication connection 102 and merchant site voice communication connection 104. It will be apparent to those of ordinary skill in the art that many types of networked voice call communication systems may be used with the various embodiments described herein. In a representative example embodiment described herein, a P2P voice communication network (e.g. Skype) is used. However, any other conventional voice communication networks could equivalently be used with the various embodiments described herein.

The P2P network, according to an example embodiment, consists of "P2P nodes" rather than "web clients" and "web servers." A P2P node may operate both as a provider and consumer of services, so it is both the client for some operations and the server for other operations. In the example system shown in FIG. 1, consumer system 350, merchant site 340, and payment site 330 all may act as a P2P node. The P2P nodes may connect to each other directly using a conventional P2P protocol. In an example embodiment described herein, a consumer system 350 (acting as a P2P node) may establish a voice call communication connection 102/104 with the merchant site 340 (acting as a P2P node) via the P2P network through network 100 using a P2P call application. A consumer P2P call application 352 is resident in the consumer system 350. A merchant P2P call application 342 is resident in the merchant site 340. The consumer P2P call application 352 can be used to create and maintain the voice call communication connection 102/104 with the merchant P2P call application 342.

Using a conventional P2P protocol, merchant site 340 may also communicate with payment site 330 via the P2P network through network 100 using a merchant interface 333 of payment site 330. In a particular embodiment, merchant interface 333 is an application programming interface (API) through which merchant site 340 may send and receive payment information to/from payment site 330. In a particular example, merchant site 340 may use merchant API 333 of payment site 330 to convey a payment request to payment site 330. Such a payment request may be related to a transaction a merchant is processing for a user of consumer system 350.

Using a conventional P2P protocol, consumer system 350 may also communicate with payment site 330 via the P2P network through network 100 using a consumer interface 332 of payment site 330. Consumer interface 332 can be used by the consumer to log into a pre-established payment site 330 financial account and to authorize payment to/from a consumer's payment site 330 financial account. Note that in conventional systems, a payment site can deposit a data object (e.g. a cookie) on a consumer system when a user of the consumer system visits the payment site and/or establishes a financial account on the payment site. Using this data object, a merchant site can detect whether or not a consumer system has an account on a particular payment site.

Figure 2:
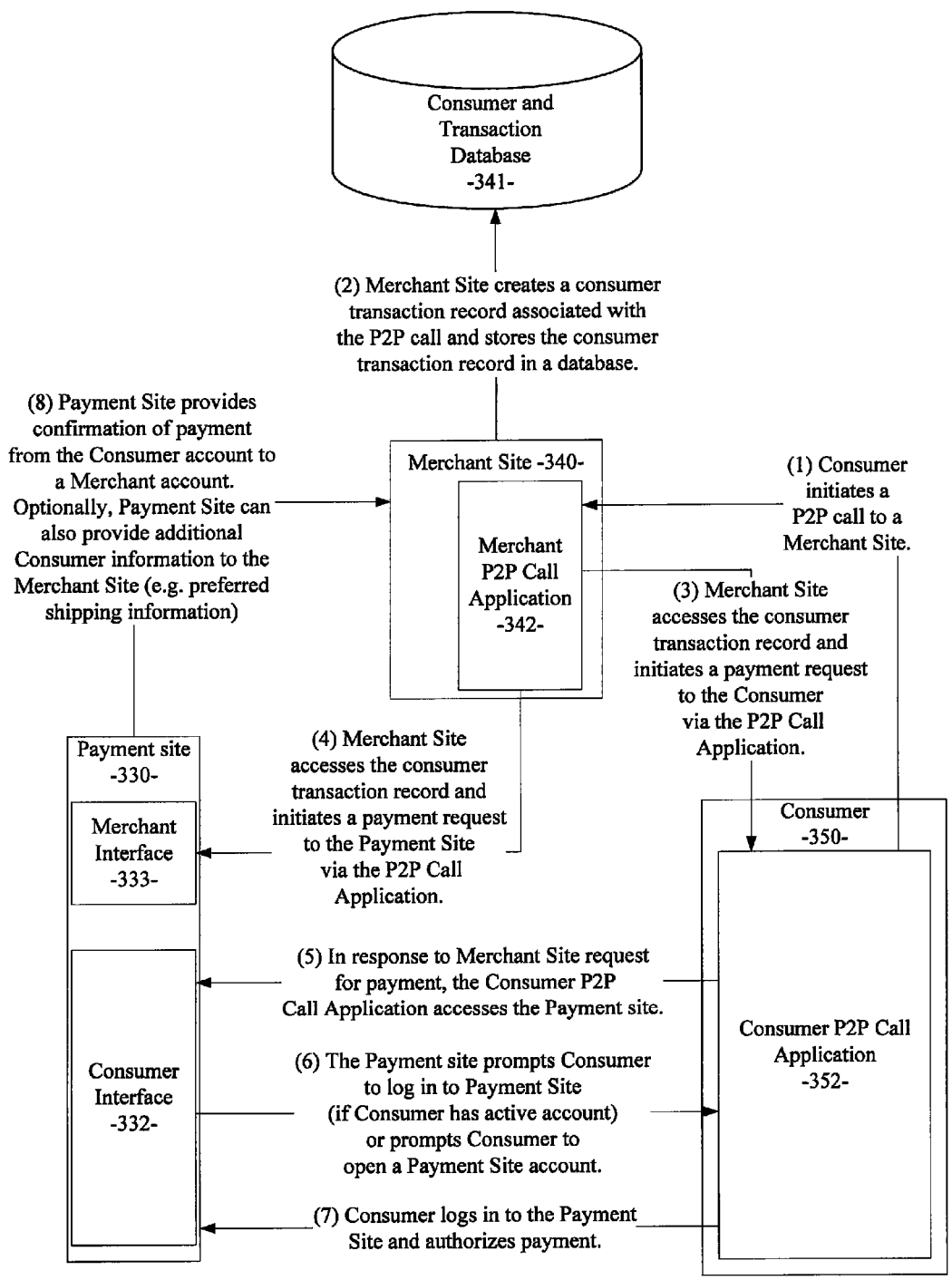
FIGS. 2-5 illustrate examples of a flow of operations, according to example embodiments.

Referring now to FIGS. 2-5, diagrams illustrate example operation flows in typical usage scenarios of various embodiments. Referring to FIG. 2, a consumer system 350 may initiate a P2P voice call to a merchant site 340 in a first operational step (1). In a second operational step (2), the merchant site 340 can create a consumer transaction record associated with the consumer system 350 P2P voice call and can store the consumer transaction record in a database or data repository 341. In operational step (3), in response to the P2P voice call from the consumer system 350, the merchant site 340 can access the consumer transaction record in the database or data repository 341 and initiate a payment request to the consumer via the consumer P2P Call Application 352. In operational step (4), the merchant site 340 can access the consumer transaction record and initiate a payment request to a merchant interface 333 of the payment site 330 via the P2P Call Application 342. In operational step (5), in response to the merchant site 340 request for payment, the consumer P2P call application 352 accesses the payment site 330. In operational step (6), the payment site 330 opens a consumer interface 332 and prompts the consumer using consumer system 350 to log in to the payment site 330 (if the consumer has an active account with the payment site 330) or prompts the consumer to open a payment site account, if the consumer has no active account with the payment site 330. In operational step (7), the consumer using consumer system 350 logs in to the payment site 330 and authorizes payment to the requesting merchant of merchant site 340. In operational step (8), the payment site 330 provides confirmation of payment from the consumer account to a merchant account. Optionally, the payment site 330 can also provide additional consumer information to the merchant site 340 (e.g. preferred shipping information). In an alternative embodiment, the consumer transaction record can be passed to the merchant site 340 via the merchant P2P call application 342 (e.g. a Skype connection). In another embodiment, a saved consumer transaction identifier can be passed to the merchant site 340 via the merchant P2P call application 342.

The payment request, as triggered by the P2P voice call from the consumer system 350, may represent charges incurred by the consumer system 350 as a result of an e-commerce transaction between the consumer system 350 and the merchant site 340. Alternatively, the payment request, as triggered by the P2P voice call from the consumer system 350, may represent charges incurred by the consumer system 350 as a result of the P2P voice call itself between the consumer system 350 and the merchant site 340. In general, the payment request, as triggered by the P2P voice call from the consumer system 350, may represent payment for charges incurred by the consumer system 350 as a result of the voice call itself (e.g. consulting services or customer support services, and the like) or a result of a purchase made while on the phone (e.g. a pizza order).

Figure 3:
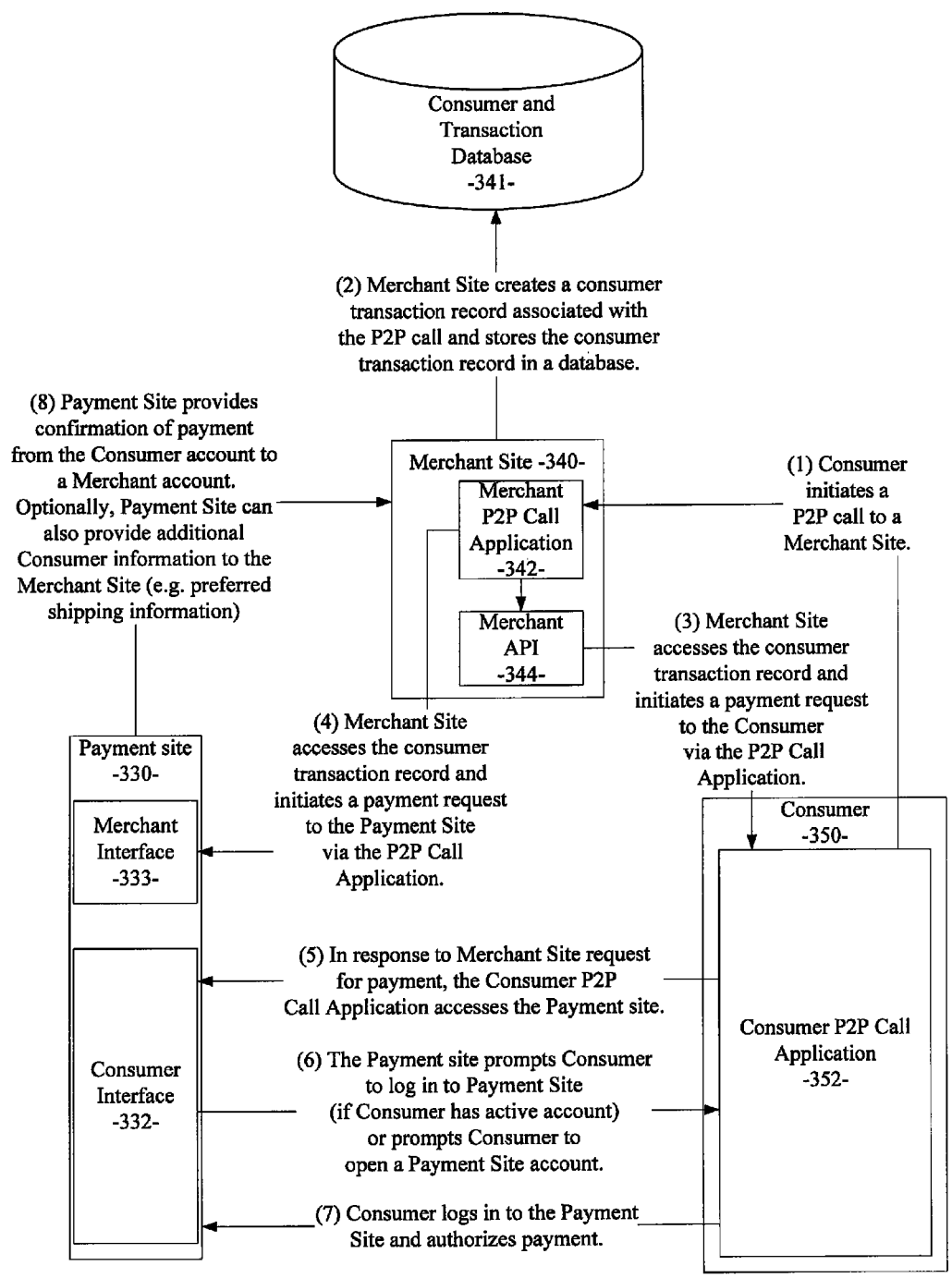

Referring to FIG. 3, a diagram illustrates an example operation flow in an alternative embodiment. In this case, the merchant site 340 may use a separate merchant application programming interface (API) 344 that can be separate from the merchant P2P call application 342. A consumer system 350 may initiate a P2P voice call to a merchant site 340 via a merchant P2P call application 342 in a first operational step (1). In a second operational step (2), the merchant site 340 can create a consumer transaction record associated with the consumer system 350 P2P voice call and can store the consumer transaction record in a database or data repository 341. In operational step (3), in response to the P2P voice call from the consumer system 350, the merchant site 340 can access the consumer transaction record in the database or data repository 341, pass the consumer transaction record to a merchant API 344, and initiate a payment request to the consumer via the merchant API 344 and the consumer P2P Call Application 352. Subsequent processing of the payment proceeds as described above and shown in FIG. 2.

Figure 4:
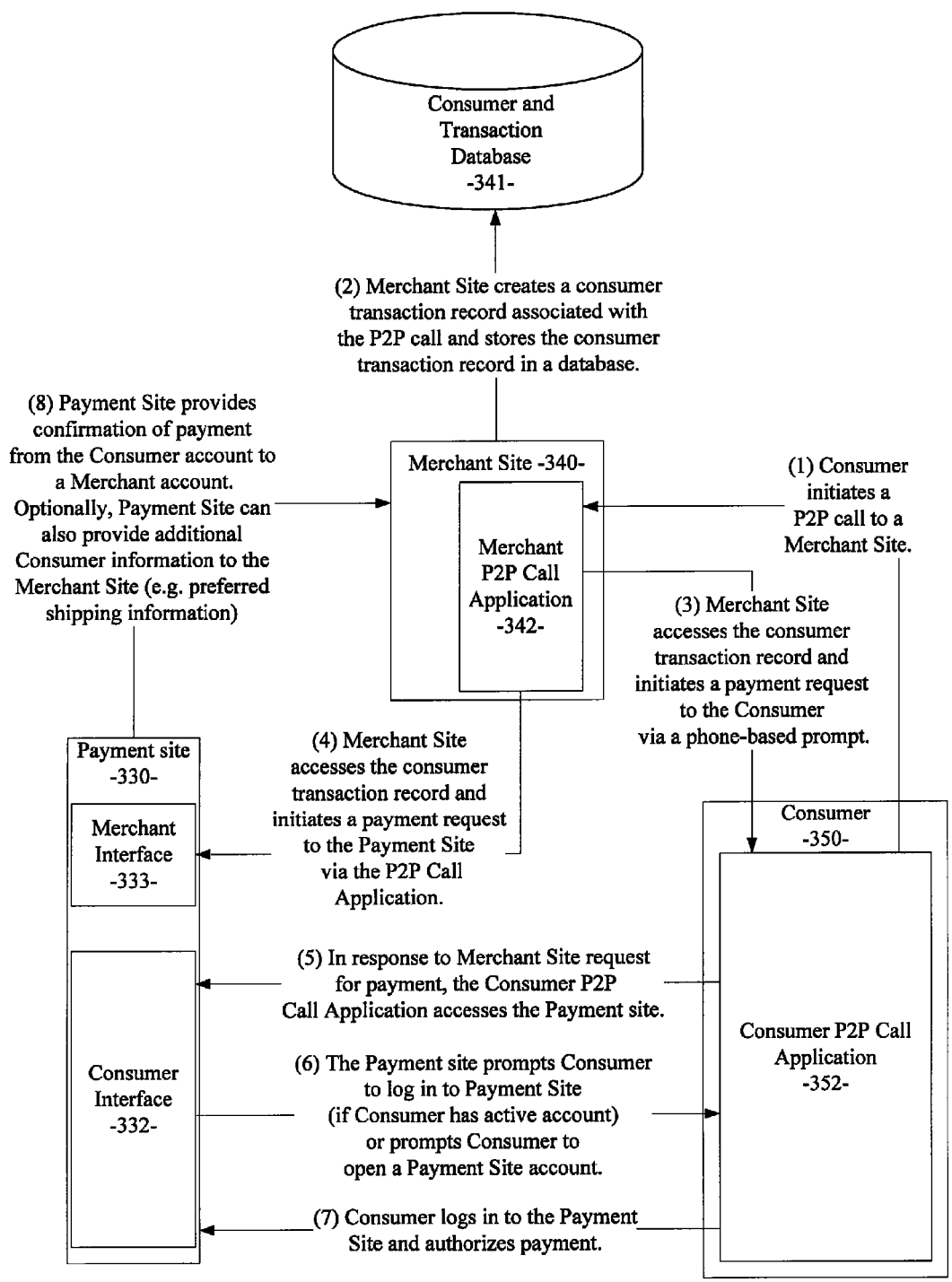

Referring to FIG. 4, a diagram illustrates an example operation flow in another alternative embodiment. In this case, the merchant site 340 may use a phone-based prompt to request payment from the consumer. As shown in FIG. 4, a consumer system 350 may initiate a P2P voice call to a merchant site 340 via a merchant P2P call application 342 in a first operational step (1). In a second operational step (2), the merchant site 340 can create a consumer transaction record associated with the consumer system 350 P2P voice call and can store the consumer transaction record in a database or data repository 341. In operational step (3), in response to the P2P voice call from the consumer system 350, the merchant site 340 can access the consumer transaction record in the database or data repository 341 and initiate a payment request to the consumer via a phone-based prompt and the consumer P2P Call Application 352. Subsequent processing of the payment proceeds as described above and shown in FIG. 2.

Figure 5:
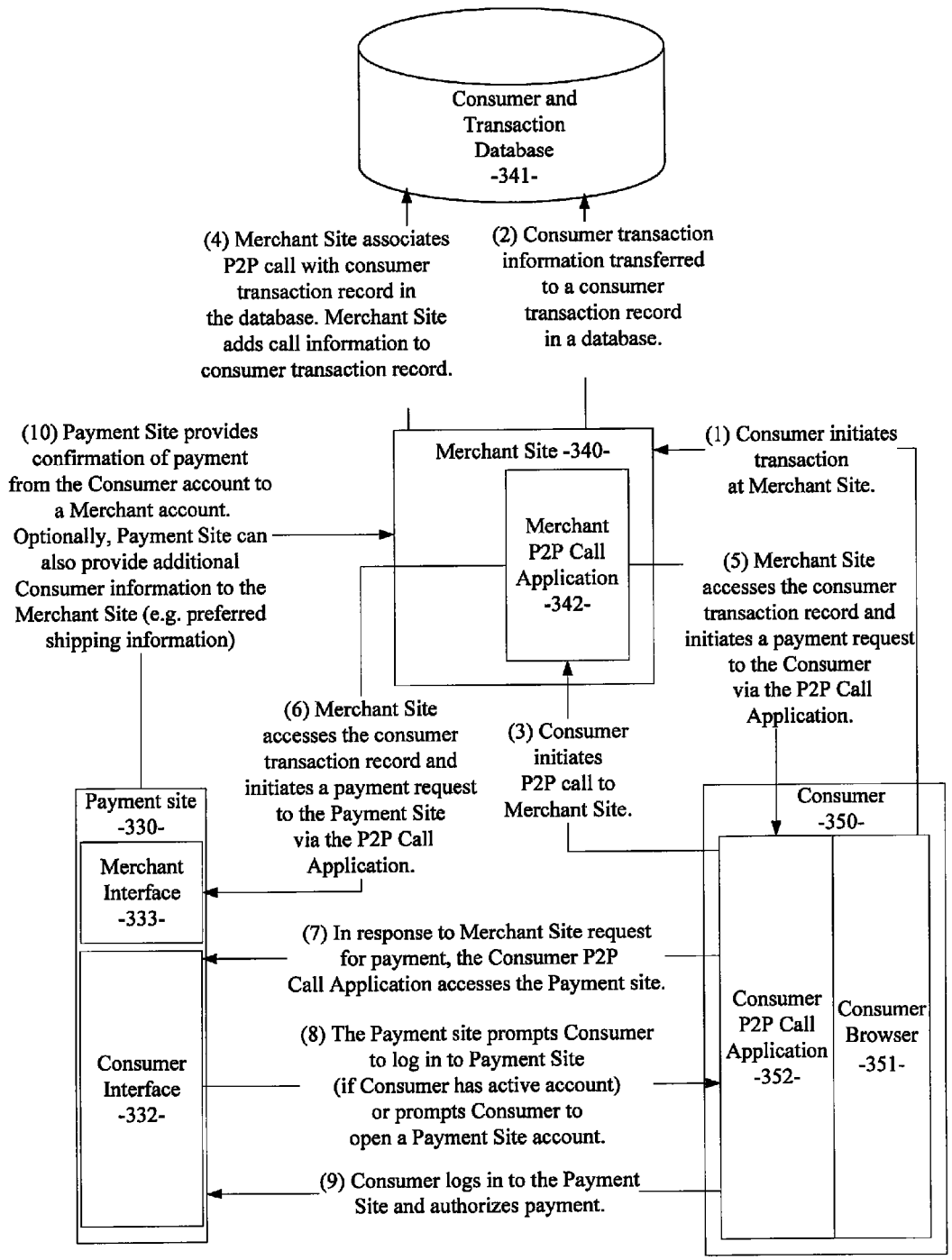

Referring to FIG. 5, a diagram illustrates an example operation flow in another alternative embodiment. In this case, a consumer system 350 may be involved in a conventional e-commerce transaction while initiating a P2P voice call with the merchant site 340. In a first operational step (1), a consumer system 350 may initiate a conventional e-commerce transaction at the merchant site 340. In a second operational step (2), the merchant site 340 can create a consumer transaction record associated with the consumer system 350 e-commerce transaction and can store the consumer transaction record in a database 341. In operational step (3), the consumer system 350 can initiate a P2P voice call to the merchant site 340 via a consumer P2P call application 352 and a merchant P2P call application 342. In operational step (4), the merchant site 340 can associate the P2P voice call with the previously-generated consumer transaction record associated with the consumer e-commerce transaction. The merchant site 340 can add P2P voice call information to the consumer transaction record and can store the updated consumer transaction record in the database 341. In operational step (5), in response to the P2P voice call from the consumer system 350, the merchant site 340 can access the consumer transaction record in the database or data repository 341 and initiate a payment request to the consumer via the consumer P2P Call Application 352. In operational step (6), the merchant site 340 can access the consumer transaction record and initiate a payment request to a merchant interface 333 of the payment site 330 via the P2P Call Application 342. Subsequent processing of the payment proceeds as described above and shown in FIG. 2.

Figure 6:
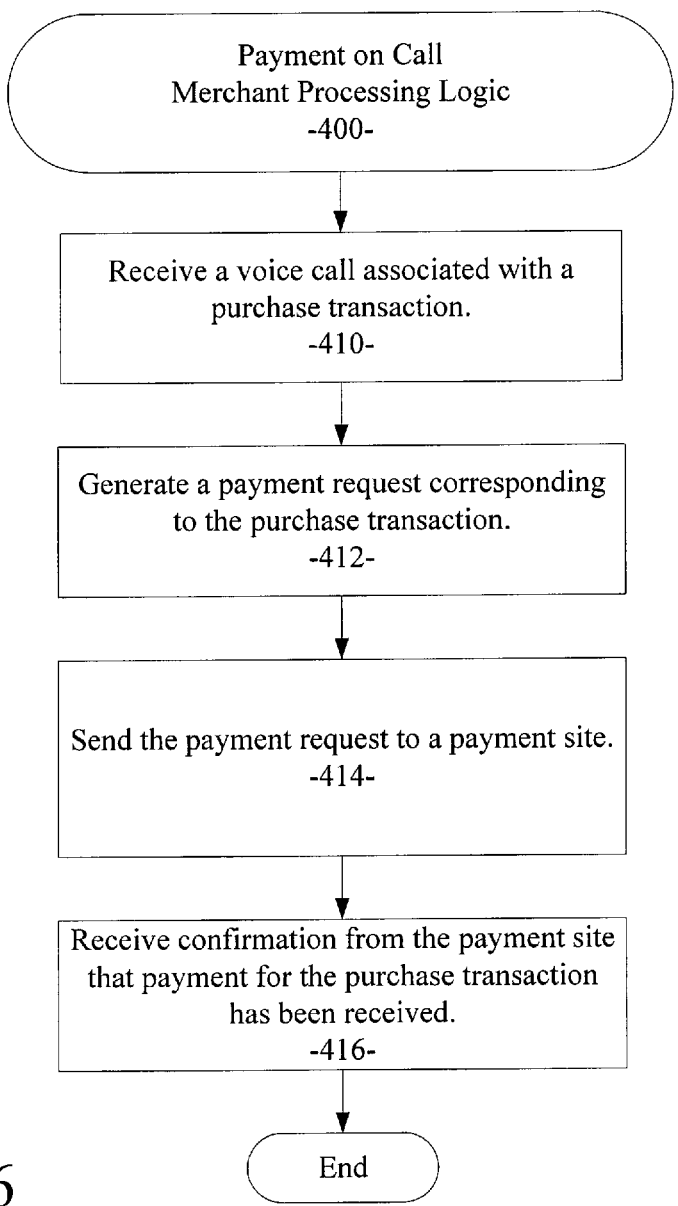
FIGS. 6-7 are processing flow diagrams illustrating examples of the processing flow, according to example embodiments.

Referring to FIG. 6, a flow diagram illustrates an example of the processing logic used for the merchant site 340. In the example embodiment, the merchant site 340 receives a P2P voice call associated with a purchase transaction from a consumer in step 410. In step 412, the merchant site 340 generates a payment request corresponding to the consumer purchase transaction. In step 414, the merchant site 340 sends the payment request to a payment site 330. In step 416, the merchant site 340 receives confirmation from the payment site that payment for the consumer purchase transaction has been received.

Figure 7:
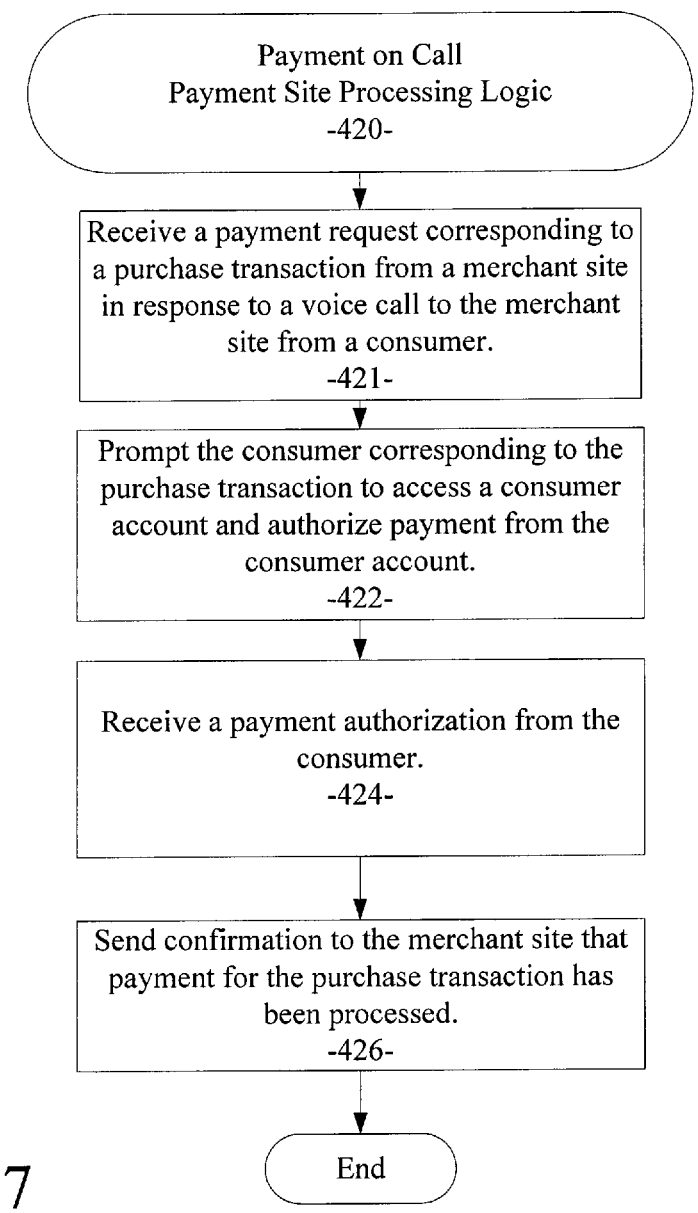

Referring to FIG. 7, a flow diagram illustrates an example of the processing logic used for the payment site 330. In the example embodiment, the payment site 330, in step 421, receives a payment request corresponding to a consumer purchase transaction from a merchant site 340 in response to a P2P voice call from a consumer of consumer system 350 to a representative of the merchant site 340 via a merchant call application 342. In step 422, the payment site 330 prompts the consumer of consumer system 350 corresponding to the purchase transaction to access a consumer account and authorize payment from the consumer account. In step 424, the payment site 330 receives a payment authorization from the consumer system 350. In step 426, the payment site 330 initiates a funds transfer from the consumer account to the merchant account and sends confirmation to the merchant site 340 that payment for the purchase transaction has been confirmed.

In an example embodiment, a large scale P2P network may employ an existing communication-based P2P network (e.g., Skype) to enable voice communication with online e-commerce. Such a network may rely on the P2P node to perform certain functions of online transactions, for example, facilitate payment and delivery or interface to existing financial mechanisms or sites (e.g., PayPal).

In a peer-to-peer network, the network connection may be shared by chat, voice traffic, and file transfers that the peer-to-peer client application supports. Because the e-commerce traffic is also passing through the peer-to-peer client application, the peer-to-peer client applications may be configured to prioritize and control bandwidth. For example when a voice call starts, the peer-to-peer client application may slow down file transfer and e-commerce traffic to maintain call quality. If a web browser was being used to view content from an e-commerce web server at the same time as a voice call (perhaps to discuss what to buy), the two applications may contend for bandwidth, reducing voice quality and giving a slow e-commerce experience.

In an example embodiment, a central e-commerce site (e.g., eBay) may connect its own sellers to the P2P network (e.g., Skype) by having the sellers link a pay peer-to-peer user name (e.g., Skype name) to a marketplace name (e.g., eBay name), then hosting a link to the P2P network within eBay's own datacenter infrastructure. This example feature allows P2P power sellers to host items on a highly available high bandwidth platform, rather than on their own computer systems, and to maintain synchronization between marketplace items (e.g., listed via a central server) and the same items listed in the P2P network.

An example embodiment provides a P2P message exchange protocol that is efficient, secure, and reliable for C2C/C2B (consumer-to-consumer/consumer-to-business) and designed for multi-channel communication networks that exploit both TCP/IP internet and VOIP-like networks. An example embodiment includes a distributed, P2P marketplace where sellers and buyers communicate over a multi-media communication network (e.g., VOIP-like communication medium provided by, for example, Skype). Authenticated application-level connections may be provided between buyers, sellers, and payment sites who exchange e-commerce related messages.

Buyers, Sellers, and payment sites may, in various example embodiments, communicate with the e-marketplace over XML/HTTPS, Web Services SOAP APIs or equivalent protocols. These marketplace interfaces may be integrated into the peer-to-peer client application (e.g., a plug-in software component that supports a P2P payment platform). The P2P payment platform may provide built-in application-to-application secure connectivity and communication services with multiple trading facilitators (e.g., eBay, PayPal, and Skype).

Figure 8:
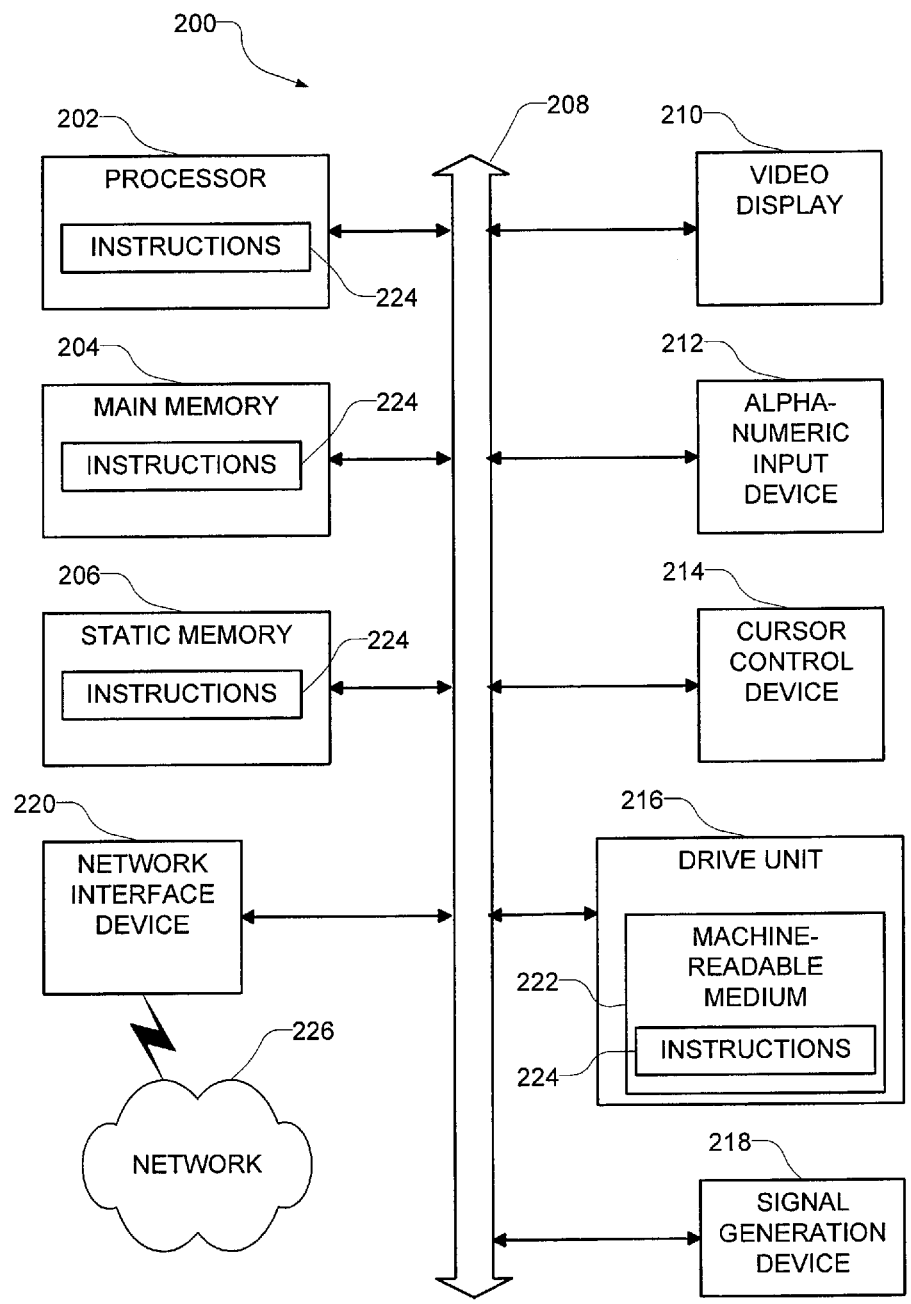
FIG. 8 shows a diagrammatic representation of machine in the example form of a computer system within which a set of instructions, for causing the machine to perform any one or more of the methodologies discussed herein, may be executed.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media. The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving, from a first party via a first party system at a second party system, a communication associated with a transaction, the communication initiating a commercial transaction at the second party system;

creating, by the second party system, a transaction record associated with the communication, the transaction record being created using information automatically retrieved from data associated with the communication;

automatically associating, by the second party system, the transaction record with the transaction;

receiving, at the second party system, a peer-to-peer (P2P) voice call, the P2P voice call being received from the first party system;

in response to the P2P voice call, initiating a first payment request, the first payment request being initiated from the second party system to the first party system, the first payment request corresponding to the transaction record, the first payment request being configured to cause the first party system to subsequently initiate a login operation at a payment server or to open a payment site account for the payment server;

initiating a second payment request from the second party system directly to the payment server via a merchant interface, the second payment request corresponding to the transaction record; and receiving confirmation from the payment server at the second party system, the confirmation being indicative of authorization of payment from the first party system to the second party system for a purchase has been received by the payment server consistent with the first and the second payment requests.

2. The method of claim 1, wherein the commercial transaction is an e-commerce transaction.

3. The method of claim 1, wherein the communication is a voice call.

4. The method of claim 3, wherein the first payment request includes a phone-based prompt provided to the first party.

5. The method of claim 1, further comprising storing information associated with the transaction record in a data repository.

6. The method of claim 1, wherein the transaction involves the communication itself.

7. The method of claim 1, wherein the initiating of the first payment request from the second party system to the first party system includes accessing the transaction record.

8. A system comprising:

one or more processors;

a network interface device communicative coupled to the one or more processors; and one or more computer-readable storage media communicatively coupled to the one or more processors and storing instructions that, in response to execution by the one or more processors cause a system to perform operations comprising:

receiving a communication associated with a transaction, the communication being received from a first party at a first party system and initiating a commercial transaction at a second party system;

creating a transaction record associated with the communication, the transaction record being created using information automatically retrieved from data associated with the communication;

automatically associating the transaction record with the transaction;

receiving a peer-to-peer (P2P) voice call, the P2P voice call being received from the first party system;

in response to the P2P voice call, initiating a first payment request, the first payment request being initiated from the system to the first party system, the first payment request corresponding to the transaction record, the first payment request being configured to cause the first party system to subsequently initiate a login operation at a payment server or to open a payment site account for the payment server;

initiating a second payment request from the system directly to the payment server via a merchant interface, the second payment request corresponding to the transaction record; and receiving confirmation from the payment server, the confirmation being indicative of authorization of payment from the first party system to the system for a purchase has been received by the payment server consistent with the first and the second payment requests.

9. The system of claim 8, wherein the commercial transaction is an e-commerce transaction.

10. The system of claim 8, wherein the communication is a voice call.

11. The system of claim 10, wherein the first payment request includes a phone-based prompt provided to the first party.

12. The system of claim 8, wherein the operations further comprise storing information associated with the transaction record in a data repository.

13. The system of claim 8, wherein the transaction involves the communication itself.

14. The system of claim 8, wherein the initiating of the first payment request from the second party system to the first party system includes accessing the transaction record.

15. A non-transitory machine-readable medium having executable instructions embedded thereon, which when executed by a machine, cause the machine to perform operations comprising:

receiving a communication associated with a transaction, the communication being received from a first party at a first party system and initiating a commercial transaction at the machine;

creating a transaction record associated with the communication, the transaction record being created using information automatically retrieved from data associated with the communication;

automatically associating the transaction record with the transaction;

receiving a P2P voice call, the P2P voice call being received from the first party system;

in response to the P2P voice call, initiating a first payment request, the first payment request being initiated from the machine to the first party system, the first payment request corresponding to the transaction record, the first payment request being configured to cause the first party system to subsequently initiate a login operation at a payment server or to open a payment site account for the payment server;

initiating a second payment request from the machine directly to the payment server via a merchant interface, the second payment request corresponding to the transaction record; and receiving confirmation from the payment server at the machine, the confirmation being indicative of authorization of payment from the first party system to the machine for a purchase has been received by the payment server consistent with the first and the second payment requests.

16. The non-transitory machine-readable medium of claim 15, wherein the commercial transaction is an e-commerce transaction.

* * * * *